(12) United States Patent
Lesso

(10) Patent No.: US 12,026,241 B2
(45) Date of Patent: *Jul. 2, 2024

(54) DETECTION OF REPLAY ATTACK

(71) Applicant: Cirrus Logic International Semiconductor Ltd., Edinburgh (GB)

(72) Inventor: John Paul Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 227 days.

This patent is subject to a terminal disclaimer.

(21) Appl. No.: 17/193,430

(22) Filed: Mar. 5, 2021

(65) Prior Publication Data

US 2021/0192033 A1 Jun. 24, 2021

Related U.S. Application Data

(63) Continuation of application No. 16/017,072, filed on Jun. 25, 2018, now Pat. No. 11,042,616.

(Continued)

(51) Int. Cl.
*G06F 21/32* (2013.01)
*G06F 3/16* (2006.01)
(Continued)

(52) U.S. Cl.
CPC .............. *G06F 21/32* (2013.01); *G06F 3/167* (2013.01); *G10L 17/00* (2013.01); *G10L 17/08* (2013.01);
(Continued)

(58) Field of Classification Search
CPC ......... G06F 21/32; G10L 17/06; G10L 25/90; G10L 13/027; G10L 17/00; G10L 17/04; G10L 25/51; G10L 25/93
See application file for complete search history.

(56) References Cited

U.S. PATENT DOCUMENTS

| | | | |
|---|---|---|---|
| 5,197,113 A | 3/1993 | Mumolo |
| 5,568,559 A | 10/1996 | Makino |

(Continued)

FOREIGN PATENT DOCUMENTS

| | | |
|---|---|---|
| AU | 2015202397 B2 | 5/2015 |
| CN | 1497970 A | 5/2004 |

(Continued)

OTHER PUBLICATIONS

International Search Report and Written Opinion of the International Searching Authority, International Application No. PCT/GB2019/052302, mailed Oct. 2, 2019.

(Continued)

*Primary Examiner* — Thomas H Maung
(74) *Attorney, Agent, or Firm* — Jackson Walker L.L.P.

(57) ABSTRACT

Detecting a replay attack on a voice biometrics system comprises receiving a speech signal; forming an autocorrelation of at least a part of the speech signal; and identifying that the received speech signal may result from a replay attack based on said autocorrelation. Identifying that the received speech signal may result from a replay attack may be achieved by: comparing the autocorrelation with a reference value; and identifying that the received speech signal may result from a replay attack based on a result of the comparison of the autocorrelation with the reference value, or by: supplying the autocorrelation to a neural network trained to distinguish autocorrelations formed from speech signals resulting from replay attacks from autocorrelations formed from speech signals not resulting from replay attacks.

9 Claims, 9 Drawing Sheets

Related U.S. Application Data

(60) Provisional application No. 62/661,411, filed on Apr. 23, 2018, provisional application No. 62/525,445, filed on Jun. 27, 2017.

(51) Int. Cl.

| | | |
|---|---|---|
| *G10L 17/00* | (2013.01) | |
| *G10L 17/08* | (2013.01) | |
| *G10L 17/24* | (2013.01) | |
| *G10L 17/26* | (2013.01) | |
| *G10L 25/06* | (2013.01) | |
| *H04K 1/00* | (2006.01) | |
| *H04L 9/40* | (2022.01) | |
| *H04W 12/06* | (2021.01) | |
| *H04L 9/32* | (2006.01) | |

(52) U.S. Cl.
CPC ............. *G10L 17/24* (2013.01); *G10L 17/26* (2013.01); *G10L 25/06* (2013.01); *H04K 1/00* (2013.01); *H04L 63/0861* (2013.01); *H04L 63/1466* (2013.01); *H04W 12/06* (2013.01); *H04L 9/3231* (2013.01)

(56) References Cited

U.S. PATENT DOCUMENTS

| | | |
|---|---|---|
| 5,710,866 A | 1/1998 | Alleva et al. |
| 5,787,187 A | 7/1998 | Bouchard et al. |
| 5,838,515 A | 11/1998 | Mortazavi et al. |
| 6,182,037 B1 | 1/2001 | Maes |
| 6,229,880 B1 | 5/2001 | Reformato et al. |
| 6,249,237 B1 | 6/2001 | Prater |
| 6,343,269 B1 | 1/2002 | Harada et al. |
| 6,480,825 B1 | 11/2002 | Sharma et al. |
| 7,016,833 B2 | 3/2006 | Gable et al. |
| 7,039,951 B1 | 5/2006 | Chaudhari et al. |
| 7,418,392 B1 | 8/2008 | Mozer et al. |
| 7,492,913 B2 | 2/2009 | Connor et al. |
| 8,442,824 B2 | 5/2013 | Aley-Raz et al. |
| 8,489,399 B2 | 7/2013 | Gross |
| 8,577,046 B2 | 11/2013 | Aoyagi |
| 8,856,541 B1 | 10/2014 | Chaudhury et al. |
| 8,997,191 B1 | 3/2015 | Stark et al. |
| 9,049,983 B1 | 6/2015 | Baldwin |
| 9,171,548 B2 | 10/2015 | Valius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,430,629 B1 | 8/2016 | Ziraknejad et al. |
| 9,484,036 B2 | 11/2016 | Kons et al. |
| 9,548,979 B1 | 1/2017 | Johnson et al. |
| 9,600,064 B2 | 3/2017 | Lee et al. |
| 9,613,640 B1 | 4/2017 | Balamurali et al. |
| 9,641,585 B2 | 5/2017 | Kvaal et al. |
| 9,646,261 B2 | 5/2017 | Agrafioli et al. |
| 9,659,562 B2 | 5/2017 | Lovitt |
| 9,665,784 B2 | 5/2017 | Derakhshani et al. |
| 9,706,304 B1 | 7/2017 | Kelso et al. |
| 9,865,253 B1 | 1/2018 | De Leon et al. |
| 9,984,314 B2 | 5/2018 | Philipose et al. |
| 9,990,926 B1 | 6/2018 | Pearce |
| 10,032,451 B1 | 7/2018 | Mamkina et al. |
| 10,063,542 B1 | 8/2018 | Kao |
| 10,079,024 B1 | 9/2018 | Bhimanaik et al. |
| 10,097,914 B2 | 10/2018 | Petrank |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,339,290 B2 | 7/2019 | Valendi et al. |
| 10,460,095 B2 | 10/2019 | Boesen |
| 10,467,509 B2 | 11/2019 | Albadawi et al. |
| 10,692,492 B2 | 6/2020 | Rozen et al. |
| 10,733,987 B1 | 8/2020 | Govender et al. |
| 10,847,165 B2 | 11/2020 | Lesso |
| 10,915,614 B2 | 2/2021 | Lesso |
| 10,977,349 B2 | 4/2021 | Suh et al. |
| 11,017,252 B2 | 5/2021 | Lesso |
| 11,023,755 B2 | 6/2021 | Lesso |
| 11,037,574 B2 | 6/2021 | Lesso |
| 11,051,117 B2 | 6/2021 | Lesso |
| 11,164,588 B2 | 11/2021 | Alonso et al. |
| 11,276,409 B2 | 3/2022 | Lesso |
| 2002/0169608 A1 | 11/2002 | Tamir et al. |
| 2002/0194003 A1 | 12/2002 | Mozer |
| 2003/0033145 A1 | 2/2003 | Petrushin |
| 2003/0177006 A1 | 9/2003 | Ichikawa et al. |
| 2003/0177007 A1 | 9/2003 | Kanazawa et al. |
| 2003/0182119 A1 | 9/2003 | Junqua et al. |
| 2004/0030550 A1 | 2/2004 | Liu |
| 2004/0141418 A1 | 7/2004 | Matsuo et al. |
| 2004/0230432 A1 | 11/2004 | Liu et al. |
| 2005/0060153 A1 | 3/2005 | Gable et al. |
| 2005/0107130 A1 | 5/2005 | Peterson, II |
| 2005/0171774 A1 | 8/2005 | Applebaum et al. |
| 2006/0116874 A1 | 6/2006 | Samuelsson et al. |
| 2006/0171571 A1 | 8/2006 | Chan et al. |
| 2007/0055517 A1 | 3/2007 | Spector |
| 2007/0129941 A1 | 6/2007 | Tavares |
| 2007/0185718 A1* | 8/2007 | Di Mambro ............. G07C 9/37 704/270.1 |
| 2007/0233483 A1 | 10/2007 | Kuppuswamy et al. |
| 2007/0250920 A1 | 10/2007 | Lindsay |
| 2007/0276658 A1 | 11/2007 | Douglass |
| 2008/0040615 A1 | 2/2008 | Carper et al. |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1 | 4/2009 | Zurek et al. |
| 2009/0105548 A1 | 4/2009 | Bart |
| 2009/0167307 A1 | 7/2009 | Kopp |
| 2009/0232361 A1 | 9/2009 | Miller |
| 2009/0281809 A1 | 11/2009 | Reuss |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0106502 A1 | 4/2010 | Farrell et al. |
| 2010/0106503 A1 | 4/2010 | Farrell et al. |
| 2010/0204991 A1 | 8/2010 | Ramakrishnan et al. |
| 2010/0328033 A1 | 12/2010 | Kamei |
| 2011/0051907 A1 | 3/2011 | Jaiswal et al. |
| 2011/0075857 A1 | 3/2011 | Aoyagi |
| 2011/0142268 A1 | 6/2011 | Iwakuni et al. |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1 | 5/2012 | Beigi |
| 2012/0223130 A1 | 9/2012 | Knopp et al. |
| 2012/0224456 A1 | 9/2012 | Visser et al. |
| 2012/0249328 A1 | 10/2012 | Xiong |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0132091 A1 | 5/2013 | Skerpac |
| 2013/0225128 A1 | 8/2013 | Gomar |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford et al. |
| 2013/0289999 A1 | 10/2013 | Hymel |
| 2014/0059347 A1 | 2/2014 | Dougherty et al. |
| 2014/0146979 A1 | 5/2014 | Puskarich |
| 2014/0149117 A1 | 5/2014 | Bakish et al. |
| 2014/0172430 A1 | 6/2014 | Rutherford et al. |

(56) References Cited

U.S. PATENT DOCUMENTS

| | | | |
|---|---|---|---|
| 2014/0188770 A1* | 7/2014 | Agrafioti | A61B 5/7267 706/13 |
| 2014/0237576 A1 | 8/2014 | Zhang et al. | |
| 2014/0241597 A1 | 8/2014 | Leite | |
| 2014/0293749 A1 | 10/2014 | Gervaise | |
| 2014/0307876 A1 | 10/2014 | Agiomyrgiannakis et al. | |
| 2014/0330568 A1 | 11/2014 | Lewis et al. | |
| 2014/0337945 A1 | 11/2014 | Jia et al. | |
| 2014/0343703 A1 | 11/2014 | Topchy et al. | |
| 2014/0358353 A1 | 12/2014 | Ibanez-Guzman et al. | |
| 2014/0358535 A1 | 12/2014 | Lee et al. | |
| 2015/0006163 A1 | 1/2015 | Liu et al. | |
| 2015/0028996 A1 | 1/2015 | Agrafioti et al. | |
| 2015/0033305 A1 | 1/2015 | Shear et al. | |
| 2015/0036462 A1 | 2/2015 | Calvarese | |
| 2015/0088509 A1 | 3/2015 | Gimenez et al. | |
| 2015/0089616 A1 | 3/2015 | Brezinski et al. | |
| 2015/0112682 A1 | 4/2015 | Rodriguez et al. | |
| 2015/0134330 A1 | 5/2015 | Baldwin et al. | |
| 2015/0161370 A1 | 6/2015 | North et al. | |
| 2015/0161459 A1 | 6/2015 | Boczek | |
| 2015/0168996 A1 | 6/2015 | Sharpe et al. | |
| 2015/0245154 A1 | 8/2015 | Dadu et al. | |
| 2015/0261944 A1 | 9/2015 | Hosom et al. | |
| 2015/0276254 A1 | 10/2015 | Nemcel et al. | |
| 2015/0301796 A1 | 10/2015 | Visser et al. | |
| 2015/0332665 A1 | 11/2015 | Mishra et al. | |
| 2015/0347734 A1 | 12/2015 | Beigi | |
| 2015/0356974 A1 | 12/2015 | Tani et al. | |
| 2015/0371639 A1 | 12/2015 | Foerster et al. | |
| 2016/0007118 A1 | 1/2016 | Lee et al. | |
| 2016/0026781 A1 | 1/2016 | Boczek | |
| 2016/0066113 A1 | 3/2016 | Elkhatib et al. | |
| 2016/0071516 A1 | 3/2016 | Lee et al. | |
| 2016/0086607 A1 | 3/2016 | Aley-Raz et al. | |
| 2016/0086609 A1 | 3/2016 | Yue et al. | |
| 2016/0111112 A1 | 4/2016 | Hayakawa | |
| 2016/0125877 A1 | 5/2016 | Foerster et al. | |
| 2016/0125879 A1 | 5/2016 | Lovitt | |
| 2016/0147987 A1 | 5/2016 | Jang et al. | |
| 2016/0148012 A1 | 5/2016 | Khitrov et al. | |
| 2016/0182998 A1 | 6/2016 | Galal et al. | |
| 2016/0210111 A1 | 7/2016 | Kraft | |
| 2016/0210407 A1 | 7/2016 | Hwang et al. | |
| 2016/0217321 A1 | 7/2016 | Gottleib | |
| 2016/0217795 A1 | 7/2016 | Lee et al. | |
| 2016/0234204 A1 | 8/2016 | Rishi et al. | |
| 2016/0248768 A1 | 8/2016 | McLaren et al. | |
| 2016/0314790 A1 | 10/2016 | Tsujikawa et al. | |
| 2016/0324478 A1 | 11/2016 | Goldstein | |
| 2016/0330198 A1 | 11/2016 | Stern et al. | |
| 2016/0371555 A1 | 12/2016 | Derakhshani | |
| 2016/0372139 A1 | 12/2016 | Cho et al. | |
| 2017/0011406 A1 | 1/2017 | Tunnell et al. | |
| 2017/0049335 A1 | 2/2017 | Duddy | |
| 2017/0068805 A1 | 3/2017 | Chandrasekharan et al. | |
| 2017/0078780 A1 | 3/2017 | Qian et al. | |
| 2017/0110117 A1 | 4/2017 | Chakladar et al. | |
| 2017/0110121 A1 | 4/2017 | Warford et al. | |
| 2017/0112671 A1 | 4/2017 | Goldstein | |
| 2017/0116995 A1 | 4/2017 | Ady et al. | |
| 2017/0134377 A1 | 5/2017 | Tokunaga et al. | |
| 2017/0150254 A1 | 5/2017 | Bakish et al. | |
| 2017/0161482 A1 | 6/2017 | Eltoft et al. | |
| 2017/0162198 A1 | 6/2017 | Chakladar et al. | |
| 2017/0169828 A1 | 6/2017 | Sachdev | |
| 2017/0200451 A1* | 7/2017 | Bocklet | G10L 17/16 |
| 2017/0213268 A1 | 7/2017 | Puehse et al. | |
| 2017/0214687 A1 | 7/2017 | Klein et al. | |
| 2017/0231534 A1 | 8/2017 | Agassy et al. | |
| 2017/0242990 A1 | 8/2017 | Chien | |
| 2017/0256270 A1 | 9/2017 | Singaraju et al. | |
| 2017/0279815 A1 | 9/2017 | Chung et al. | |
| 2017/0287490 A1 | 10/2017 | Biswal et al. | |
| 2017/0293749 A1 | 10/2017 | Baek et al. | |
| 2017/0323644 A1 | 11/2017 | Kawato | |
| 2017/0347180 A1 | 11/2017 | Petrank | |
| 2017/0347348 A1 | 11/2017 | Masaki et al. | |
| 2017/0351487 A1 | 12/2017 | Aviles-Casco Vaquero et al. | |
| 2017/0373655 A1 | 12/2017 | Mengad et al. | |
| 2018/0018974 A1 | 1/2018 | Zass | |
| 2018/0032712 A1 | 2/2018 | Oh et al. | |
| 2018/0039769 A1 | 2/2018 | Saunders et al. | |
| 2018/0047393 A1 | 2/2018 | Tian et al. | |
| 2018/0060552 A1 | 3/2018 | Pellom et al. | |
| 2018/0060557 A1 | 3/2018 | Valenti et al. | |
| 2018/0096120 A1 | 4/2018 | Boesen | |
| 2018/0107866 A1 | 4/2018 | Li et al. | |
| 2018/0108225 A1 | 4/2018 | Mappus et al. | |
| 2018/0113673 A1 | 4/2018 | Sheynblat | |
| 2018/0121161 A1 | 5/2018 | Ueno et al. | |
| 2018/0146370 A1 | 5/2018 | Krishnaswamy et al. | |
| 2018/0166071 A1 | 6/2018 | Lee et al. | |
| 2018/0174600 A1 | 6/2018 | Chaudhuri et al. | |
| 2018/0176215 A1 | 6/2018 | Perotti et al. | |
| 2018/0187969 A1 | 7/2018 | Kim et al. | |
| 2018/0191501 A1 | 7/2018 | Lindemann | |
| 2018/0197525 A1 | 7/2018 | Kikuhara et al. | |
| 2018/0232201 A1 | 8/2018 | Holtmann | |
| 2018/0232511 A1 | 8/2018 | Bakish | |
| 2018/0233142 A1 | 8/2018 | Koishida et al. | |
| 2018/0239955 A1 | 8/2018 | Rodriguez et al. | |
| 2018/0240463 A1 | 8/2018 | Perotti | |
| 2018/0254046 A1 | 9/2018 | Khoury et al. | |
| 2018/0289354 A1 | 10/2018 | Cvijanovic et al. | |
| 2018/0292523 A1 | 10/2018 | Orenstein et al. | |
| 2018/0308487 A1 | 10/2018 | Goel et al. | |
| 2018/0324518 A1 | 11/2018 | Dusan et al. | |
| 2018/0330727 A1 | 11/2018 | Tulli | |
| 2018/0336716 A1 | 11/2018 | Ramprashad et al. | |
| 2018/0336901 A1 | 11/2018 | Masaki et al. | |
| 2018/0342237 A1 | 11/2018 | Lee et al. | |
| 2018/0349585 A1 | 12/2018 | Ahn et al. | |
| 2018/0352332 A1 | 12/2018 | Tao | |
| 2018/0358020 A1 | 12/2018 | Chen et al. | |
| 2018/0366124 A1 | 12/2018 | Cilingir et al. | |
| 2018/0374487 A1 | 12/2018 | Lesso | |
| 2018/0376234 A1 | 12/2018 | Petrank | |
| 2019/0005963 A1 | 1/2019 | Alonso et al. | |
| 2019/0005964 A1 | 1/2019 | Alonso et al. | |
| 2019/0013033 A1 | 1/2019 | Bhimanaik et al. | |
| 2019/0027152 A1 | 1/2019 | Huang et al. | |
| 2019/0030452 A1 | 1/2019 | Fassbender et al. | |
| 2019/0042871 A1 | 2/2019 | Pogorelik | |
| 2019/0043512 A1 | 2/2019 | Huang et al. | |
| 2019/0065478 A1 | 2/2019 | Tsujikawa et al. | |
| 2019/0098003 A1 | 3/2019 | Ota | |
| 2019/0103115 A1 | 4/2019 | Lesso | |
| 2019/0114496 A1 | 4/2019 | Lesso | |
| 2019/0114497 A1 | 4/2019 | Lesso | |
| 2019/0115030 A1 | 4/2019 | Lesso | |
| 2019/0115032 A1 | 4/2019 | Lesso | |
| 2019/0115033 A1 | 4/2019 | Lesso | |
| 2019/0115046 A1 | 4/2019 | Lesso | |
| 2019/0122670 A1 | 4/2019 | Roberts et al. | |
| 2019/0147888 A1 | 5/2019 | Lesso | |
| 2019/0149920 A1 | 5/2019 | Putzeys et al. | |
| 2019/0149932 A1 | 5/2019 | Lesso | |
| 2019/0180014 A1 | 6/2019 | Kovvali et al. | |
| 2019/0197755 A1 | 6/2019 | Vats | |
| 2019/0199935 A1 | 6/2019 | Danielsen et al. | |
| 2019/0228778 A1 | 7/2019 | Lesso | |
| 2019/0228779 A1 | 7/2019 | Lesso | |
| 2019/0246075 A1 | 8/2019 | Khadloya et al. | |
| 2019/0260731 A1 | 8/2019 | Chandrasekharan et al. | |
| 2019/0287536 A1 | 9/2019 | Sharifi et al. | |
| 2019/0294629 A1 | 9/2019 | Wexler et al. | |
| 2019/0295554 A1 | 9/2019 | Lesso | |
| 2019/0304470 A1 | 10/2019 | Ghaemmaghami et al. | |
| 2019/0306594 A1 | 10/2019 | Aumer et al. | |
| 2019/0306613 A1 | 10/2019 | Qian et al. | |
| 2019/0311722 A1 | 10/2019 | Caldwell | |
| 2019/0313014 A1 | 10/2019 | Welbourne et al. | |
| 2019/0318035 A1 | 10/2019 | Blanco et al. | |

(56) References Cited

U.S. PATENT DOCUMENTS

| | | |
|---|---|---|
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0184057 A1 | 6/2020 | Mukund |
| 2020/0204937 A1 | 6/2020 | Lesso |
| 2020/0227071 A1 | 7/2020 | Lesso |
| 2020/0265834 A1 | 8/2020 | Lesso et al. |
| 2020/0286492 A1 | 9/2020 | Lesso |
| 2021/0303669 A1 | 9/2021 | Lesso |
| 2022/0382846 A1 | 12/2022 | Koshinaka et al. |

FOREIGN PATENT DOCUMENTS

| | | |
|---|---|---|
| CN | 1937955 A | 3/2007 |
| CN | 101228787 A | 7/2008 |
| CN | 101578637 A | 11/2009 |
| CN | 102246228 A | 11/2011 |
| CN | 103109495 A | 5/2013 |
| CN | 103477604 A | 12/2013 |
| CN | 104038625 A | 9/2014 |
| CN | 104252860 A | 12/2014 |
| CN | 104956715 A | 9/2015 |
| CN | 105185380 A | 12/2015 |
| CN | 105244031 A | 1/2016 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 106537889 A | 3/2017 |
| CN | 107251573 A | 10/2017 |
| EP | 1205884 A2 | 5/2002 |
| EP | 1600791 A1 | 11/2005 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| EP | 3466106 A1 | 4/2019 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| TW | 200820218 A | 5/2008 |
| WO | 9834216 A | 8/1998 |
| WO | 0208147 A1 | 10/2002 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019002831 A1 | 1/2019 |
| WO | 2019008387 A1 | 1/2019 |
| WO | 2019008389 A1 | 1/2019 |
| WO | 2019008392 A1 | 1/2019 |

OTHER PUBLICATIONS

Liu, Yuan et al., "Speaker verification with deep features", Jul. 2014, in International Joint Conference on Neural Networks (IJCNN), pp. 747-753, IEEE.

International Search Report and Written Opinion of the International Searching Authority, International Application No. PCT/GB2018/051927, mailed Sep. 25, 2018.

Combined Search and Examination Report under Sections 17 and 18(3), UKIPO, Application No. 1801530.5, mailed Jul. 25, 2018.

International Search Report and Written Opinion of the International Searching Authority, International Application No. PCT/GB2018/051924, mailed Sep. 26, 2018.

Combined Search and Examination Report under Sections 17 and 18(3), UKIPO, Application No. 1801526.3, mailed Jul. 25, 2018.

International Search Report and Written Opinion of the International Searching Authority, International Application No. PCT/GB2018/051931, mailed Sep. 27, 2018.

Combined Search and Examination Report under Sections 17 and 18(3), UKIPO, Application No. 1801527.1, mailed Jul. 25, 2018.

International Search Report and Written Opinion of the International Searching Authority, International Application No. PCT/GB2018/051925, mailed Sep. 26, 2018.

Combined Search and Examination Report under Sections 17 and 18(3), UKIPO, Application No. 1801528.9, mailed Jul. 25, 2018.

International Search Report and Written Opinion of the International Searching Authority, International Application No. PCT/GB2018/051928, mailed Dec. 3, 2018.

Combined Search and Examination Report under Sections 17 and 18(3), UKIPO, Application No. 1801532.1, mailed Jul. 25, 2018.

Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.

International Search Report and Written Opinion of the International Searching Authority, International Application No. PCT/GB2018/053274, mailed Jan. 24, 2019.

Beigi, Homayoon, "Fundamentals of Speaker Recognition," Chapters 8-10, ISBN: 978-0-378-77592-0; 2011.

Li, Lantian et al., "A Study on Replay Attack and Anti-Spoofing for Automatic Speaker Verification", INTERSPEECH 2017, Jan. 1, 2017, pp. 92-96.

Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.

Partial International Search Report of the International Searching Authority, International Application No. PCT/GB2018/052905, mailed Jan. 25, 2019.

Further Search Report under Sections 17 (6), UKIPO, Application No. GB1719731.0, mailed Nov. 26, 2018.

Combined Search and Examination Report, UKIPO, Application No. GB1713695.3, mailed Feb. 19, 2018.

Zhang et al., An Investigation of Deep-Learing Frameworks for Speaker Verification Antispoofing—IEEE Journal of Selected Topics in Signal Processes, Jun. 1, 2017.

Combined Search and Examination Report under Sections 17 and 18(3), UKIPO, Application No. GB1804843.9, mailed Sep. 27, 2018.

Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.

Combined Search and Examination Report under Sections 17 and 18(3), UKIPO, Application No. GB1803570.9, mailed Aug. 21, 2018.

Combined Search and Examination Report under Sections 17 and 18(3), UKIPO, Application No. GB1801661.8, mailed Jul. 30, 2018.

(56) References Cited

OTHER PUBLICATIONS

Combined Search and Examination Report under Sections 17 and 18(3), UKIPO, Application No. GB1801663.4, mailed Jul. 18, 2018.
Combined Search and Examination Report under Sections 17 and 18(3), UKIPO, Application No. GB1801664.2, mailed Aug. 1, 2018.
Combined Search and Examination Report under Sections 17 and 18(3), UKIPO, Application No. GB1719731.0, mailed May 16, 2018.
Combined Search and Examination Report, UKIPO, Application No. GB1801874.7, mailed Jul. 25, 2018.
Combined Search and Examination Report under Sections 17 and 18(3), UKIPO, Application No. GB1801659.2, mailed Jul. 26, 2018.
International Search Report and Written Opinion of the International Searching Authority, International Application No. PCT/GB2018/052906, mailed Jan. 14, 2019.
International Search Report and Written Opinion of the International Searching Authority, International Application No. PCT/GB2019/050185, mailed Apr. 2, 2019.
Combined Search and Examination Report under Sections 17 and 18(3), UKIPO, Application No. GB1809474.8, mailed Jul. 23, 2018.
Ajmera, et al,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, mailed Aug. 3, 2018.
International Search Report and Written Opinion of the International Searching Authority, International Application No. PCT/GB2018/051787, mailed Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, mailed Aug. 16, 2018.
Combined Search and Examination Report under Sections 17 and 18(3), UKIPO, Application No. GB1713697.9, mailed Feb. 20, 2018.
Chen et al., "You Can Hear But You Cannot Steal: Defending Against Voice Impersonation Attacks on Smartphones", Proceedings of the International Conference on Distributed Computing Systems, PD: Jun. 5, 2017.
International Search Report and Written Opinion of the International Searching Authority, International Application No. PCT/GB2018/052907, mailed Jan. 15, 2019.
Combined Search and Examination Report under Sections 17 and 18(3), UKIPO, Application No. GB1713699.5, mailed Feb. 21, 2018.
International Search Report and Written Opinion of the International Searching Authority, International Application No. PCT/GB2019/052143, mailed Sep. 17, 2019.
Lucas, Jim, What Is Electromagnetic Radiation? Live Science, Mar. 13, 2015, NY, NY.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Wu, Libing, et al., LVID: A Multimodal Biometricas Authentication System on Smartphones, IEEE Transactions on Information Forensics and Security, Vo. 15, 2020, pp. 1572-1585.
Wang, Qian, et al., VoicePop: A Pop Noise based Anti-spoofing System for Voice Authentication on Smartphones, IEEE INFOCOM 2019—IEEE Conference on Computer Communications, Apr. 29-May 2, 2019, pp. 2062-2070.
Examination Report under Section 18(3), UKIPO, Application No. GB1918956.2, mailed Jul. 29, 2021.
Examination Report under Section 18(3), UKIPO, Application No. GB1918965.3, mailed Aug. 2, 2021.
Combined Search and Examination Report under Sections 17 and 18(3), UKIPO, Application No. GB2105613.0, mailed Sep. 27, 2021.
Combined Search and Examination Report under Sections 17 and 18(3), UKIPO, Application No. GB2114337.5, mailed Nov. 3, 2021.
First Office Action, China National Intellectual Property Administration, Application No. 2018800720846, mailed Mar. 1, 2021.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, Date of Issue May 29, 2020.
International Search Report and Written Opinion, International Application No. PCT/GB2020/050723, mailed Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
Meng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
Combined Search and Examination Report under Sections 17 and 18(3), UKIPO, Application No. GB2112228.8, mailed May 17, 2022.
Search Report under Section 17, UKIPO, Application No. GB2202521.7, mailed Jun. 21, 2022.
Combined Search and Examination Report under Sections 17 and 18(3), UKIPO, Application No. GB2210986.2, mailed Nov. 15, 2022.
First Office Action, China National Intellectual Property Administration, Application No. 201800658351, mailed Feb. 4, 2023.
Search Report, China National Intellectual Property Administration, Application No. 201800658351, dated Feb. 2, 2023.
First Office Action, China National Intellectual Property Administration, Application No. 2018800452077, mailed Feb. 25, 2023.
First Office Action, China National Intellectual Property Administration, Application No. 2018800452787, mailed Mar. 14, 2023.
First Office Action, China National Intellectual Property Administration, Patent Application No. 2018800419187, issued Feb. 28, 2023, received Apr. 28, 2023.
Notice of Preliminary Rejection, Korean Intellectual Property Office, Patent Application No. 10-2020-7002065, dated Apr. 17, 2023.
Notice of Preliminary Rejection, Korean Intellectual Property Office, Patent Application No. 10-2020-7002061, dated Apr. 27, 2023.
Wu et al., A study on replay attack and anti-spoofing for text-dependent speaker verification, Signal and Information Processing Association Annual Summit and Conference (APSIPA), 2014 Asia-Pacific, Dec. 9-12, 2014, IEEE.

(56) References Cited

OTHER PUBLICATIONS

Jain et al., An Introduction to Biometric Recognition, IEEE Transactions on Circuits and Systems for Video Technology, vol. 14, No. 1, pp. 4-20, Jan. 2004.

* cited by examiner

DETECTION OF REPLAY ATTACK

The present disclosure is a continuation of U.S. Non-Provisional patent application Ser. No. 16/017,072, filed Jun. 25, 2018, which claims priority to U.S. Provisional Patent Application Ser. No. 62/661,411, filed Apr. 23, 2018, and U.S. Provisional Patent Application Ser. No. 62/525,445, filed Jun. 27, 2017, each of which is incorporated by reference herein in its entirety.

TECHNICAL FIELD

Embodiments described herein relate to methods and devices for detecting a replay attack on a voice biometrics system.

BACKGROUND

Voice biometrics systems are becoming widely used. In such a system, a user trains the system by providing samples of their speech during an enrolment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

SUMMARY

According to an aspect of the present invention, there is provided a method of detecting a replay attack on a voice biometrics system. The method comprises: receiving a speech signal; forming an autocorrelation of at least a part of the speech signal; and identifying that the received speech signal may result from a replay attack based on said autocorrelation.

Identifying that the received speech signal may result from a replay attack may comprise: comparing the autocorrelation with a reference value; and identifying that the received speech signal may result from a replay attack based on a result of the comparison of the autocorrelation with the reference value. In that case, the reference value may be an autocorrelation obtained from a user during enrolment, or the reference value may be a property of autocorrelations obtained from multiple users.

Identifying that the received speech signal may result from a replay attack may comprise: supplying the autocorrelation to a neural network trained to distinguish autocorrelations formed from speech signals resulting from replay attacks from autocorrelations formed from speech signals not resulting from replay attacks.

The received speech signal may include speech segments and non-speech segments, and the method may then comprise: selecting the speech segments of the speech signal; and forming an autocorrelation of the selected speech segments of the speech signal.

The received speech signal may include voiced speech segments and unvoiced speech segments, and the method may then comprise: selecting the voiced speech segments of the speech signal; and forming an autocorrelation of the selected voiced speech segments of the speech signal.

Forming an autocorrelation of at least a part of the speech signal may comprise: dividing the speech signal into frames of data; forming a respective partial autocorrelation of each of the frames of data; and averaging said partial autocorrelations to form said autocorrelation.

According to another aspect of the present invention, there is provided a system for detecting a replay attack on a voice biometrics system, the system being configured for: receiving a speech signal; forming an autocorrelation of at least a part of the speech signal; and identifying that the received speech signal may result from a replay attack based on said autocorrelation.

Identifying that the received speech signal may result from a replay attack may comprise: comparing the autocorrelation with a reference value; and identifying that the received speech signal may result from a replay attack based on a result of the comparison of the autocorrelation with the reference value.

The reference value may be an autocorrelation obtained from a user during enrolment.

The reference value may be a property of autocorrelations obtained from multiple users.

Identifying that the received speech signal may result from a replay attack may comprise: supplying the autocorrelation to a neural network trained to distinguish autocorrelations formed from speech signals resulting from replay attacks from autocorrelations formed from speech signals not resulting from replay attacks.

When the received speech signal includes speech segments and non-speech segments, the system may be configured for: selecting the speech segments of the speech signal; and forming an autocorrelation of the selected speech segments of the speech signal.

When the received speech signal includes voiced speech segments and unvoiced speech segments, the system may be configured for: selecting the voiced speech segments of the speech signal; and forming an autocorrelation of the selected voiced speech segments of the speech signal.

Forming an autocorrelation of at least a part of the speech signal may comprise: dividing the speech signal into frames of data; forming a respective partial autocorrelation of each of the frames of data; and averaging said partial autocorrelations to form said autocorrelation.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to a second aspect of the present invention, there is provided a method of speaker identification, comprising:
   receiving a speech signal;
   forming an autocorrelation of at least a part of the speech signal;
   comparing at least a part of the autocorrelation with at least one previously stored autocorrelation; and
   identifying a speaker based on said comparison.

The received speech signal may include speech segments and non-speech segments, and the method may then comprise:
   selecting the speech segments of the speech signal; and
   forming an autocorrelation of the selected speech segments of the speech signal.

The received speech signal may include voiced speech segments and unvoiced speech segments, and the method may then comprise:

selecting the voiced speech segments of the speech signal; and forming an autocorrelation of the selected voiced speech segments of the speech signal.

Forming an autocorrelation of at least a part of the speech signal may comprise:

dividing the speech signal into frames of data;

forming a respective partial autocorrelation of each of the frames of data; and averaging said partial autocorrelations to form said autocorrelation.

Comparing at least a part of the autocorrelation with at least one previously stored autocorrelation may comprise:

comparing a part of the autocorrelation over a range of lag values with at least one previously stored autocorrelation.

The range of lag values may be a predetermined range of lag values.

The range of lag values may be determined based on said autocorrelation of at least a part of the speech signal.

The range of lag values may exclude lag values corresponding to lags shorter than a lag at which a first positive maximum in the autocorrelation occurs.

The previously stored autocorrelation may be an autocorrelation obtained from a user during enrolment.

According to a further aspect, there is provided a system for speaker identification, comprising:

an input for receiving a speech signal; and a processor configured for:

forming an autocorrelation of at least a part of the speech signal;

comparing at least a part of the autocorrelation with at least one previously stored autocorrelation; and identifying a speaker based on said comparison.

There is also provided a device comprising such a system.

The device may comprise a mobile telephone, an audio player, a video player, a mobile computing platform, a games device, a remote controller device, a toy, a machine, or a home automation controller or a domestic appliance.

There is also provided a computer program product, comprising a computer-readable tangible medium, and instructions for performing a method according to the second aspect.

There is also provided a non-transitory computer readable storage medium having computer-executable instructions stored thereon that, when executed by processor circuitry, cause the processor circuitry to perform a method according to the second aspect. There is also provided a device comprising that non-transitory computer readable storage medium.

The device may comprise a mobile telephone, an audio player, a video player, a mobile computing platform, a games device, a remote controller device, a toy, a machine, or a home automation controller or a domestic appliance.

According to a third aspect of the present invention, there is provided a method of speaker verification, comprising:

receiving a speech signal containing speech of a speaker;

forming an autocorrelation of at least a part of the speech signal;

performing a first comparison of at least one feature from a first range of lag values of the autocorrelation with a reference value obtained from at least one other autocorrelation;

identifying that the received speech signal may result from a replay attack based on said first comparison;

performing a second comparison of a part of the autocorrelation over a second range of lag values with at least one previously stored autocorrelation obtained from a user during enrolment; and determining whether the speaker is said user based on said second comparison.

According to another aspect of the present invention, there is provided a computer program product, comprising a computer-readable tangible medium, and instructions for performing a method according to the first, second, or third aspect.

According to another aspect of the present invention, there is provided a non-transitory computer readable storage medium having computer-executable instructions stored thereon that, when executed by processor circuitry, cause the processor circuitry to perform a method according to the first, second, or third aspect.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
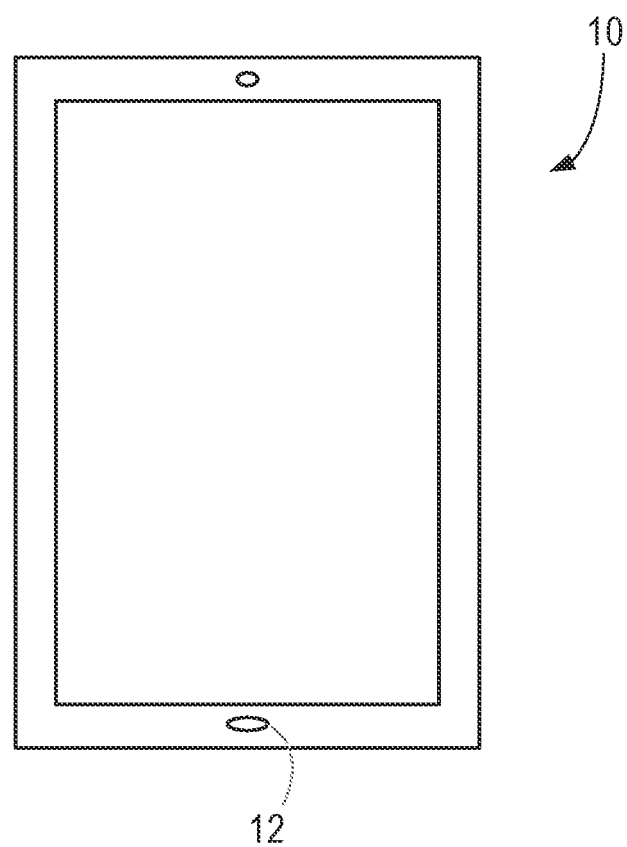
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10.

Figure 2:
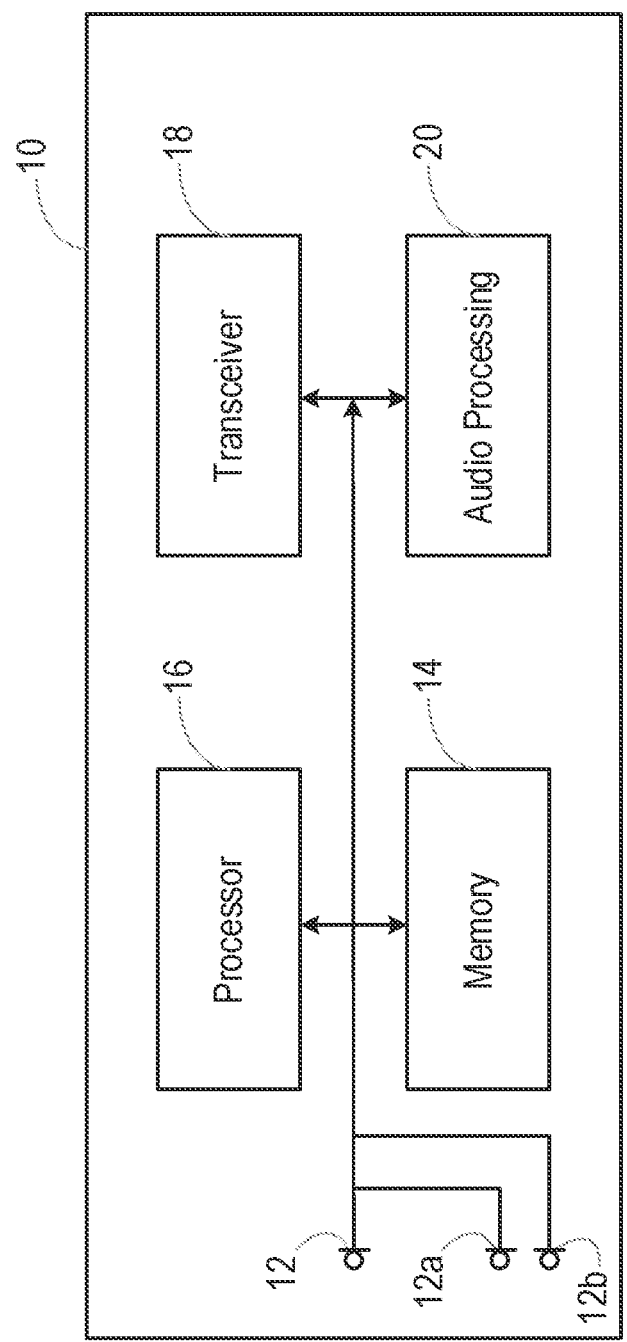
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

One attempt to deceive a voice biometric system is to play a recording of an enrolled user's voice in a so-called replay or spoof attack.

Figure 3:
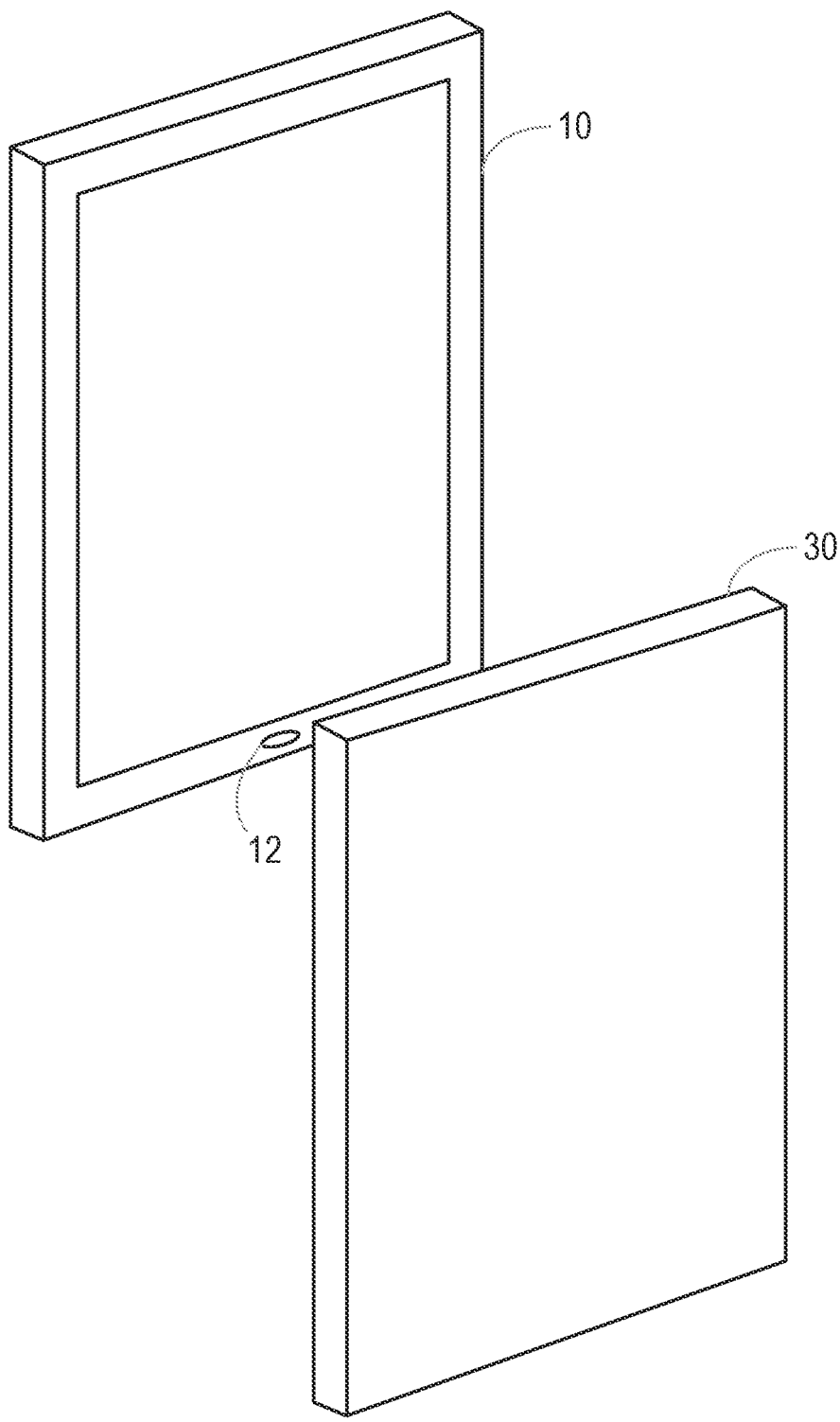
FIG. 3 illustrates a situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone 12 inlet of the smartphone 10, and the recording of the enrolled user's voice is played back. If the voice biometric system is unable to determine that the enrolled user's voice that it recognises is a recording, the attacker will gain access to one or more services that are intended to be accessible only by the enrolled user.

It is known that smartphones, such as the smartphone 30, are typically provided with loudspeakers that are of relatively low quality. Thus, the recording of an enrolled user's voice played back through such a loudspeaker will not be a perfect match with the user's voice, and this fact can be used to identify replay attacks. For example, many loudspeakers may have certain frequency characteristics, in which the bass response is limited by the size of the loudspeaker diaphragm. In particular, many loudspeakers may have a poor frequency response at frequencies that are contained in the speech of typical speakers.

A human voice can be regarded as having a fundamental frequency, which is dependent on the physiology of the speaker. The fundamental frequency is the inverse of the "glottal pulse period", which depends on physical properties of the speaker's vocal tract. For example, a typical adult male might have a fundamental frequency in the range of from 85-155 Hz, while a typical adult female might have a fundamental frequency in the range of from 165-255 Hz. However, the speech of both typical male speakers and typical female speakers contains components at frequencies that are poorly reproduced by smartphone loudspeakers, for example below 100 Hz.

Speech is a mixture of voiced and unvoiced speech. Voiced speech can be regarded as a series of pulses at this fundamental frequency, which are passed through a filter formed by the shape of the speaker's tongue, palate, lips, etc. This produces speech with a spectrum that contains components at the fundamental frequency, plus harmonic components at multiples of the fundamental frequency.

A relatively low quality loudspeaker may have a poor frequency response at the fundamental frequency of a speaker's voice. Methods described herein determine when a speaker's voice has been recorded and replayed through such a loudspeaker.

Figure 4:
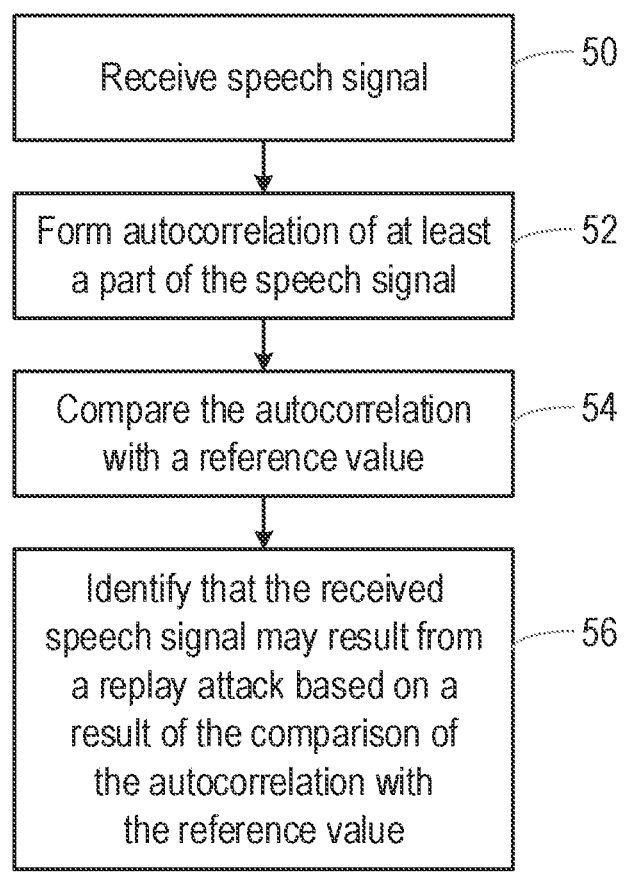
FIG. 4 is a flow chart illustrating a method of detecting a replay attack.
Figure 5:
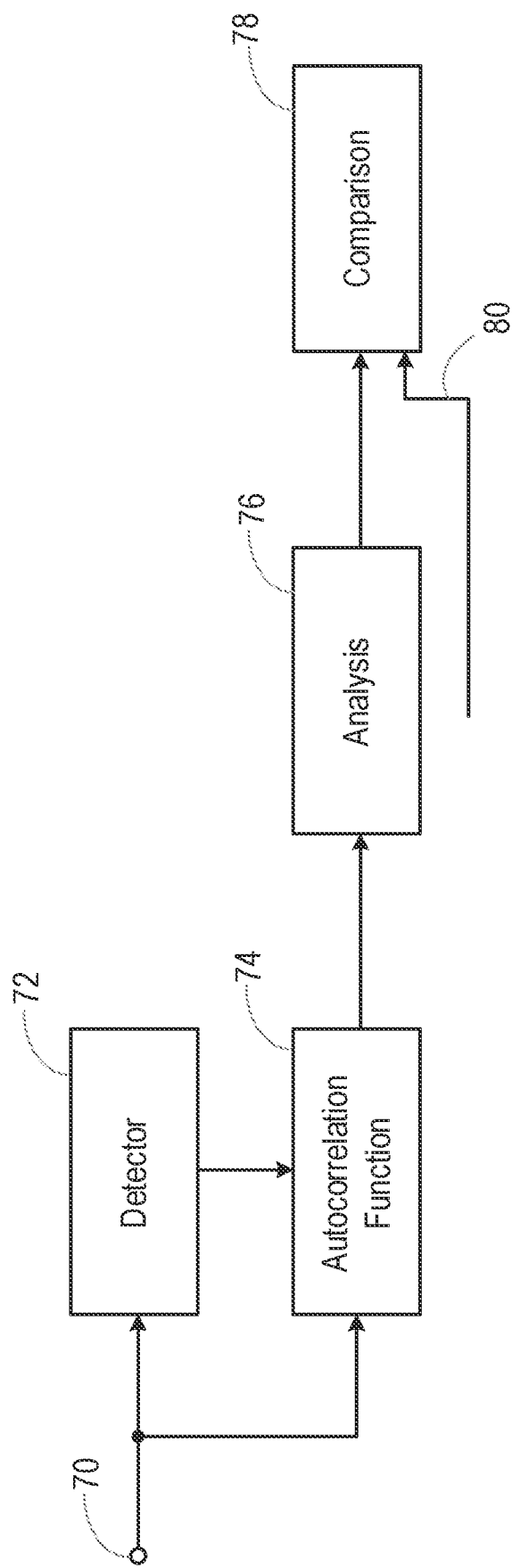
FIG. 5 illustrates a system for detecting a replay attack.

FIG. 4 is a flow chart, illustrating a method of detecting a replay attack on a voice biometrics system, and FIG. 5 is a block diagram illustrating functional blocks in the voice biometrics system.

Specifically, in step 50 in the method of FIG. 4, a speech signal is received on an input 70 of the system shown in FIG. 5.

The speech signal is passed to a detector 72, which in some embodiments selects a part of the speech signal.

The method disclosed herein detects properties of the user's speech that are particularly evident when the speaker is forming voiced speech (for example vowel sounds). Therefore, in some embodiments, the detector 72 identifies speech segments of the speech signal (that is, segments of the speech signal that represent times when the user is speaking). In other embodiments, the detector 72 identifies voiced speech segments of the speech signal (that is, segments of the speech signal that represent times when the user is forming voiced sounds, as opposed to unvoiced or voiceless sounds).

In step 52 in the method of FIG. 4, an autocorrelation of at least a part of the speech signal is formed.

The received speech signal is passed to an autocorrelation function block 74.

If the detector 72 is present, then the autocorrelation function block 74 may be activated only during the selected segments of the speech signal. That is, the autocorrelation function block 74 may be activated only during the identified speech segments of the speech signal, or only during the identified voiced speech segments of the speech signal.

The autocorrelation function block 74 operates on digital signals and so, if the received speech signal is in analog form, it is converted to digital form. The received speech signal, or the selected segments of the speech signal, are then divided into frames. Each frame may for example have a length in the range of 10-30 ms, and the frames may overlap. That is, with a frame length of 20 ms, each frame may start 10 ms after the start of the previous frame, for example.

Within each frame, an autocorrelation function is performed in a conventional manner. That is, the sequence of samples in the frame is correlated with a delayed copy of itself, for a range of delay (or lag) values. In practice, as is known, the autocorrelation may be obtained using a Fast Fourier Transform. Specifically, the autocorrelation $R_{xx}[n]$ of the signal x[m], as a function of the lag, i.e. number of samples, n, by which the copy is delayed, is given by:

$$R_{xx}[n] = \sum_{m=-\infty}^{\infty} x^*[m]x[n+m].$$

Thus, with zero lag, there is a perfect correlation. For other lag values that degree of correlation will be a function of the lag, which can conveniently be measured by the number of sample periods by which the delayed version has been delayed.

Conventionally, the size of the correlation for any lag value is normalised against the size of the correlation at zero lag, i.e. $R_{xx}[0]$, which is taken to be 1.

This picks out frequencies which are contained in the received signal. When a received signal contains a component at a frequency f, the autocorrelation function will typically include a peak at the number of sample periods that corresponds to the inverse of that frequency 1/f.

Figure 6:
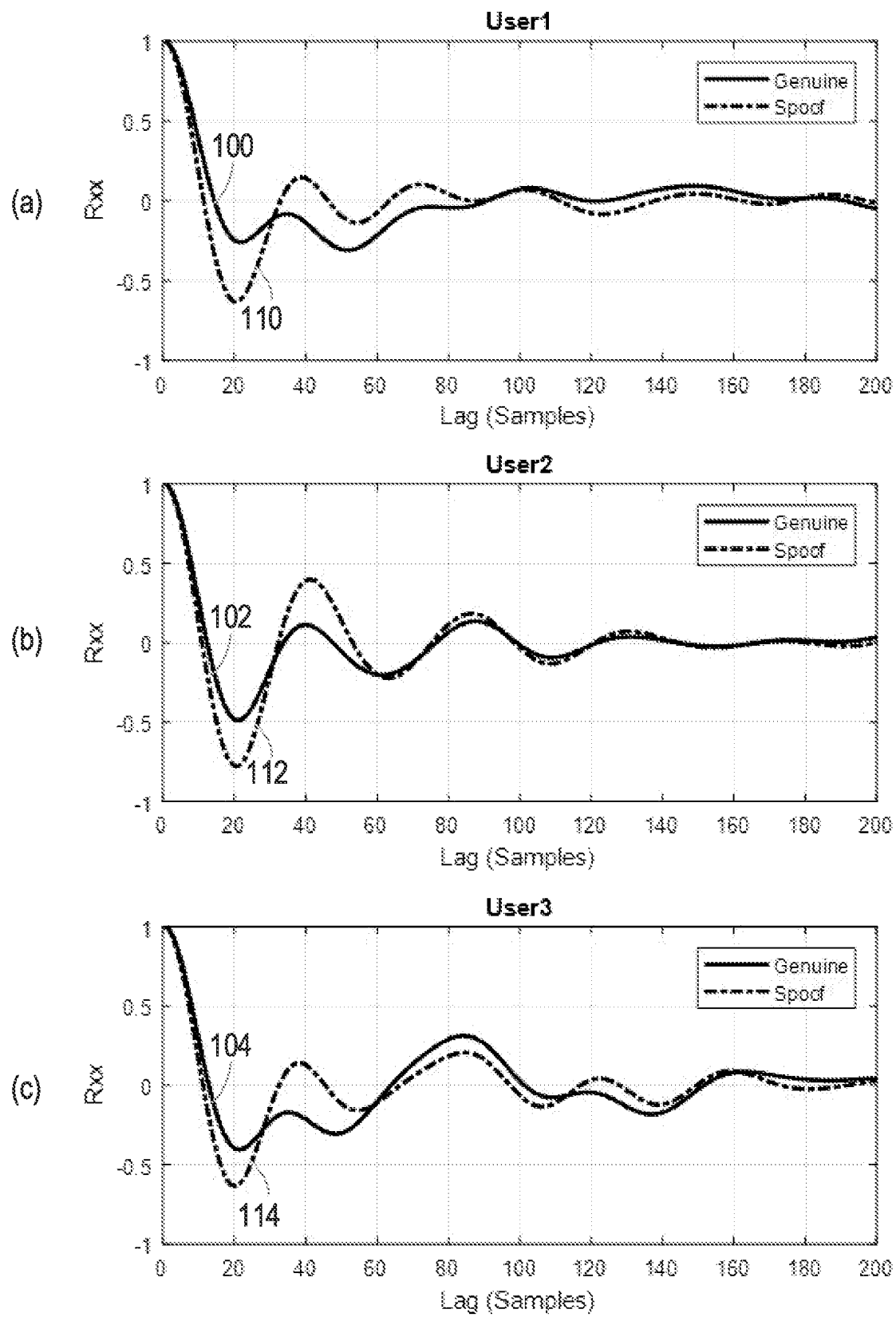
FIG. 6 illustrates a detectable effect of a replay attack.

FIG. 6 illustrates the results of performing the autocorrelation function on speech signals received from three different speakers. Thus, In FIGS. 6(a), 6(b), and 6(c) respectively, the lines 100, 102, 104 represent the autocorrelation function. In these cases, the autocorrelation function is calculated for the first 200 lags. In general, the autocorrelation can be calculated for the number of lags that is sufficient to show the features of the autocorrelation function that are used in the analysis stage.

FIG. 6 also illustrates the results of performing the autocorrelation signal on the same speech signals after these signals have been high-pass filtered, which is equivalent to the effect of replaying the signals through a relatively low quality loudspeaker which has a poor low frequency response (for example below 300 Hz). Thus, In FIGS. 6(a), 6(b), and 6(c) respectively, the lines 110, 112, 114 represent the autocorrelation function obtained from the filtered signals.

It can be seen that the autocorrelation functions obtained from the filtered signals are significantly different from the autocorrelation functions obtained from the unfiltered signals. For example, the autocorrelation functions obtained from the filtered signals have more prominent swings between the positive peaks (the maxima) and the negative peaks (the minima).

This difference between the autocorrelation functions can be used to identify when the autocorrelation function has been obtained from a signal generated during a replay attack.

In the system of FIG. 5, the output of the autocorrelation function block 74 is passed to an analysis block 76, which selects at least one feature of the autocorrelation function that has been obtained.

Figure 7:
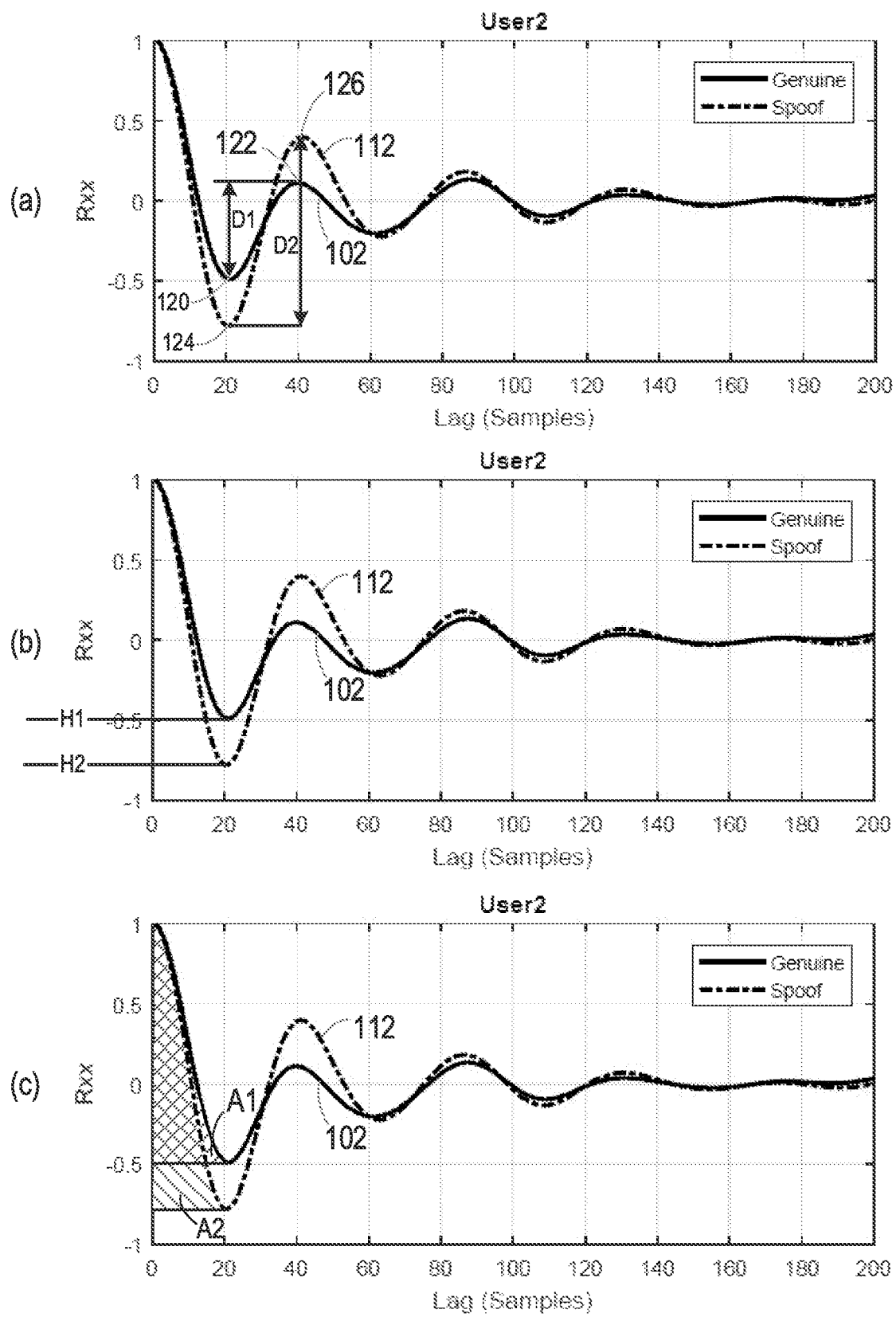
FIG. 7 illustrates features that can be extracted from results.

FIG. 7 illustrates possible features that can be selected.

FIGS. 7(a), 7(b), and 7(c) are each a copy of the results shown in FIG. 6(b), namely the results of performing the autocorrelation signal on speech signals received from three different speakers. Thus, In FIGS. 7(a), 7(b), and 7(c), the lines 102 represent the result of performing the autocorrelation function on the speech signal, and the lines 112 represent the result of performing the autocorrelation function on the same speech signal after it has been high-pass filtered.

FIG. 7(a) then illustrates one particular feature that can be selected, namely the difference between the value of the autocorrelation function at the first minimum and the value of the autocorrelation function at the first maximum. In the case of the autocorrelation function 102, this is the difference between the first minimum value at the point 120 and the first maximum value at the point 122, and this is shown in FIG. 7(a) as the difference D1. In the case of the autocorrelation function 112, this is the difference between the first minimum value at the point 124 and the first maximum value at the point 126, and this is shown in FIG. 7(a) as the difference D2.

It can be seen that D2 is considerably larger than D1, and that this would be true whichever of the results shown in FIG. 6 had been chosen for the purposes of illustration.

FIG. 7(b) illustrates an alternative feature that can be selected, namely the absolute value of the autocorrelation function at the first minimum. In the case of the autocorrelation function 102, the first minimum value is –H1, and so the absolute value is H1. In the case of the autocorrelation function 112, the first minimum value is –H2, and so the absolute value is H2.

It can be seen that H2 is considerably larger than H1, and that this would be true whichever of the results shown in FIG. 6 had been chosen for the purposes of illustration.

FIG. 7(c) illustrates a further alternative feature that can be selected, namely the area underneath the autocorrelation function up to the first minimum. In the case of the autocorrelation function 102, this area is shown in FIG. 7(c) as A1. In the case of the autocorrelation function 112, this area is shown in FIG. 7(c) as A2.

It can be seen that A2 is considerably larger than A1, and that this would be true whichever of the results shown in FIG. 6 had been chosen for the purposes of illustration.

It is mentioned above that the autocorrelation function might be calculated for each frame in a series of frames. As an alternative, a single autocorrelation function can be calculated for a longer time period, for example for an entire utterance, rather than for each frame of the utterance. For clarity of illustration and explanation, FIGS. 6 and 7 show the results of performing the autocorrelation function on the sequence of samples in one utterance, for example lasting from 1-5 seconds. However, the autocorrelation function may be performed on the sequence of samples in one frame, and then performed on the sequence of samples in a second frame, and so on, for example for at least ten frames.

Then, the resulting autocorrelation functions can be averaged to form a cumulative average autocorrelation function that is recalculated after each new frame. In another embodiment, a running average of a certain number of the most recently calculated autocorrelation functions can be formed, for example by taking a simple average of the calculated autocorrelation functions from a certain number of frames, (such as the three, or five, most recent frames).

In the optional step 54 in the method of FIG. 4, the selected feature or features of the autocorrelation function (which may be the average autocorrelation function as mentioned above) is or are compared with at least one reference value.

The selected feature or features of the autocorrelation function is passed to a comparison block 78, and a reference value 80 is passed to another input of the comparison block 78. In other embodiments, the reference value may be stored permanently or temporarily in the comparison block 78.

In step 56 in the method of FIG. 4, it is identified based on the autocorrelation whether the received speech signal may result from a replay attack. In some embodiments, in which step 54 has been performed, this determination is based on a result of the comparison of the autocorrelation with the reference value. When multiple autocorrelation functions are calculated as described above, for example once per frame, the comparison can also be made once per frame, or the multiple autocorrelation functions can be averaged and the comparison can be made using the average.

In some embodiments, the reference value 80 is specific to the enrolled user of the system who is assumed to be speaking. In other embodiments, the reference value 80 is a threshold value or a property that is used for all speakers.

When the reference value 80 is specific to the enrolled user of the system who is assumed to be speaking, an autocorrelation function of the user's speech is obtained during the enrolment process, and one or more property or feature of that autocorrelation function is extracted.

When the reference value 80 is a threshold value or a property that is used for all speakers, a suitable value or property can be obtained from analysis of the autocorrelation functions obtained from a large number of speakers, and from a large number of replay attacks.

For example, as mentioned above with reference to FIG. 7(*b*), the absolute value of the first minimum value of the autocorrelation function can be used as a property that is used in determining whether the speech signal is genuine or results from a replay attack.

When the reference value 80 is specific to the enrolled user of the system who is assumed to be speaking, an autocorrelation function of the user's speech is obtained during the enrolment process, and the relevant property or feature of that autocorrelation function is extracted. Thus, FIG. 6(*a*) shows that the value of the first minimum value of the autocorrelation function 100 obtained from a genuine recording of one particular speaker is about −0.2. This can be used to set a threshold value for the absolute value of, say, 0.3. Then, whenever an autocorrelation function obtained from that user's speech signal has an absolute value of the first minimum value that is above the threshold value of 0.3, this can be used as an indication that the speech signal results from a replay attack. A similar analysis of the speech signals obtained from other users during enrolment will allow an individual threshold to be set for each speaker.

When the reference value 80 is a threshold value or a property that is used for all speakers, a suitable value or property can be obtained from analysis of the autocorrelation functions obtained from a large number of speakers, and from a large number of replay attacks. Thus, FIG. 6 shows that the absolute value of the first minimum value of the autocorrelation function obtained from each of the genuine recordings is smaller than 0.5, while the absolute value of the first minimum value of the autocorrelation function obtained from each of the filtered recordings is greater than 0.5.

This can be used to set a threshold value of 0.5. Then, whenever an autocorrelation function obtained from a user's speech signal has an absolute value first minimum value that is above the threshold value of 0.5, this can be used as an indication that the speech signal results from a replay attack. This avoids the need to perform an autocorrelation on the speech signal obtained from every user during enrolment.

Rather than set a single threshold value, a more complex vector of features can be obtained from an autocorrelation function, and compared with similar feature vectors extracted from the autocorrelation functions obtained from a large number of genuine speech signals, and from a large number of replay attacks. A conventional method, for example using a Gaussian Mixture Model (GMM), can then be used to determine whether it is more likely that the newly obtained autocorrelation function is more similar to the autocorrelation functions obtained from the genuine speech signals, or from the replay attacks. This determination can then be used to identify whether the newly received speech signal may result from a replay attack.

In the embodiment shown in FIG. 4 above, the autocorrelation function is compared with at least one reference value in step 54 of the method, and it is identified based on the comparison of the autocorrelation with the reference value whether the received speech signal may result from a replay attack. As mentioned above, when multiple autocorrelation functions are calculated, for example once per frame, each calculated autocorrelation function can be compared with the reference value, and it can be determined that the received speech signal may result from a replay attack if any one of these comparisons gives a suitable result. Alternatively, the multiple calculated autocorrelation functions can be averaged and the comparison can be made using the average.

In some other embodiments, the determination whether the received speech signal may result from a replay attack is carried out using a neural network. Specifically, a neural network may be trained using training data comprising (a) autocorrelations formed from speech signals resulting from replay attacks, and (b) autocorrelations formed from speech signals not resulting from replay attacks.

Then, when the autocorrelation formed from at least a part of the received speech signal is sent to the neural network, the neural network is able to judge whether the received speech signal may result from a replay attack, based on the autocorrelation. In this case, it is useful to compress the autocorrelation before sending it to the neural network. For example, the compression may be performed by calculating the discrete cosine transform (DCT) of the autocorrelation, or the average autocorrelation as described above, and keeping the most significant terms (for example the 10 bottom, i.e. the 10 most significant) terms, and passing these to the neural net, which will have been trained on similarly compressed data obtained from (a) autocorrelations formed from speech signals resulting from replay attacks, and (b) autocorrelations formed from speech signals not resulting from replay attacks.

Figure 8:
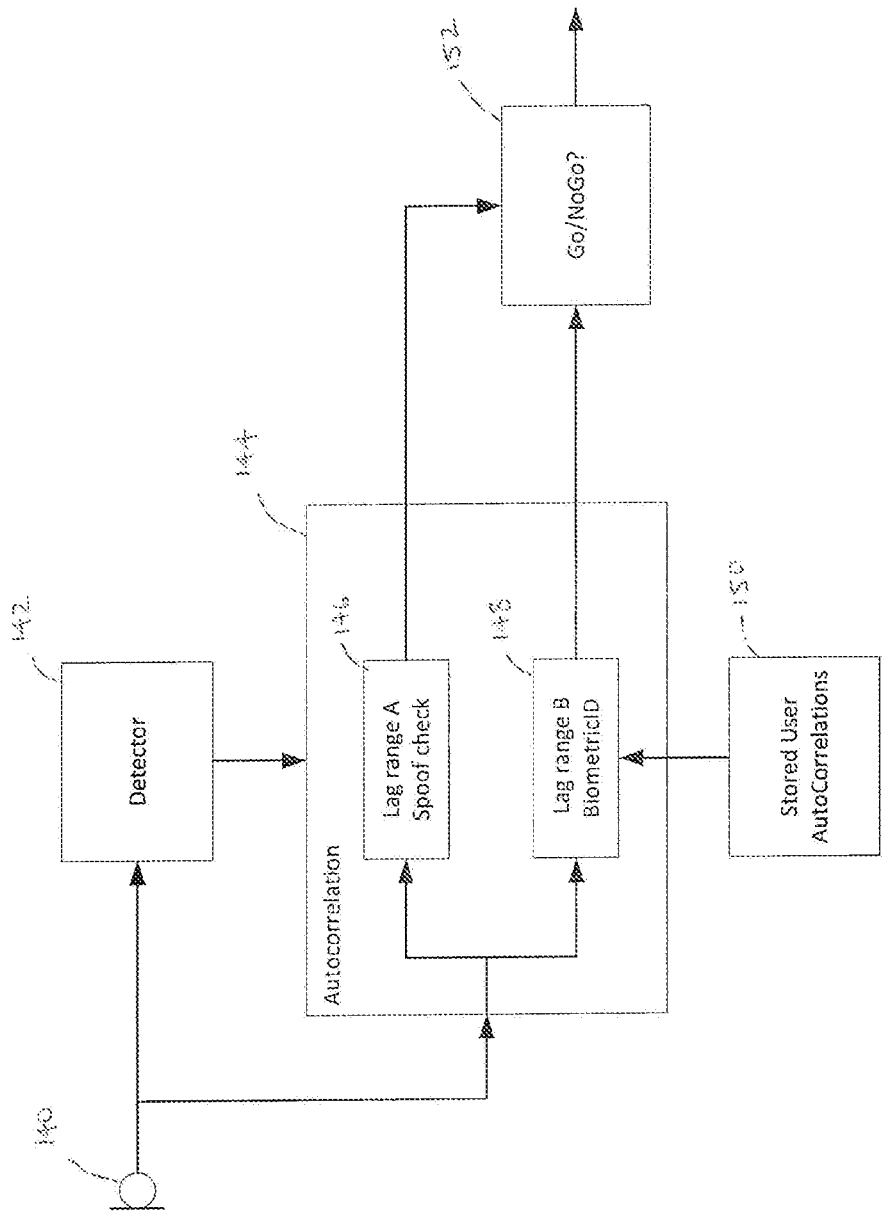
FIG. 8 illustrates a system for detecting a replay attack and performing a speaker recognition process.
Figure 9:
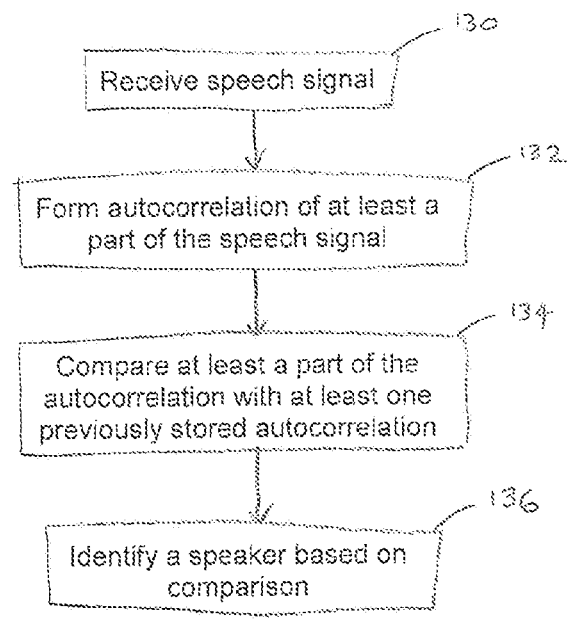
FIG. 9 is a flow chart illustrating a method of speaker identification.

FIG. 8 is a block diagram illustrating functional blocks in an alternative voice biometrics system, and FIG. 9 is a flow chart illustrating a method of operation of the system for performing speaker identification. The system shown in FIG. 8 is similar in some respects to the system shown in FIG. 5.

At step 130 of the process shown in FIG. 9, a speech signal is received from a microphone 140. The speech signal is passed to a detector 142, which in some embodiments selects a part of the speech signal.

The method disclosed herein detects properties of the user's speech that are particularly evident when the speaker is forming voiced speech (for example vowel sounds). Therefore, in some embodiments, the detector 142 identifies speech segments of the speech signal (that is, segments of the speech signal that represent times when the user is speaking). In other embodiments, the detector 72 identifies voiced speech segments of the speech signal (that is, segments of the speech signal that represent times when the user is forming voiced sounds, as opposed to unvoiced or voiceless sounds).

The received speech signal is passed to an autocorrelation function block 144, and at step 132 of the process shown in FIG. 9 an autocorrelation is performed.

If the detector 142 is present, then the autocorrelation function block 144 may be activated only during the selected segments of the speech signal. That is, the autocorrelation function block 144 may be activated only during the identified speech segments of the speech signal, or only during the identified voiced speech segments of the speech signal.

The autocorrelation function block 144 operates on digital signals and so, if the microphone 140 is an analog microphone generating a received speech signal in analog form, it is converted to digital form. The received speech signal, or the selected segments of the speech signal, are then divided into frames.

Within each frame, an autocorrelation function is performed in a conventional manner. That is, the sequence of samples in the frame is correlated with a delayed copy of itself, for a range of delay (or lag) values. Specifically, the autocorrelation $R_{xx}[n]$ of the signal $x[m]$, as a function of the lag, i.e. number of samples, n, by which the copy is delayed, is given by:

$$R_{xx}[n] = \sum_{m=-\infty}^{\infty} x^*[m]x[n+m].$$

Thus, with zero lag, there is a maximum correlation. For other lag values that degree of correlation will be a function of the lag, which can conveniently be measured by the number of sample periods by which the delayed version has been delayed. Conventionally, the size of the correlation for any lag value is normalised against the size of the correlation at zero lag, which is taken to be 1.

This picks out frequencies which are contained in the received signal. When a received signal contains a component at a frequency f, the autocorrelation function will typically include a peak at the number of sample periods that corresponds to the inverse of that frequency $1/f$.

The result of performing the autocorrelation function may be analysed in a spoof check block 146 and/or a biometric identification block 148.

The spoof check block 146 operates in a similar way to the system shown in FIG. 5. That is, a first lag range, A, is defined, and the autocorrelation obtained over that lag range of the function is examined.

The lag range A may be predetermined. For example, in the case of the autocorrelation functions shown in FIGS. 6 and 7, the lag range A might be the range from 0-50 samples. This is enough to allow the features of the first minimum and the first maximum to be examined, as desired.

As an alternative, the lag range A might be determined based on the shape of the autocorrelation function itself. For example, the lag range A might be the range from zero samples up to the location of the first positive peak +10%, or might be the range of 10 samples either side of the first positive peak, or might be the range from 10 samples below the first negative peak to 10 samples above the first positive peak, or any range that covers.

For example, as described with reference to FIG. 7(*a*), the selected feature may be the difference between the value of the autocorrelation function at the first minimum and the value of the autocorrelation function at the first maximum; as described with reference to FIG. 7(*b*), the selected feature may be the absolute value of the autocorrelation function at the first minimum; as described with reference to FIG. 7(*c*), the selected feature may be the area underneath the autocorrelation function up to the first minimum.

The selected feature can be compared with an appropriate threshold value, in order to determine whether the received signal should be considered to be a result of a replay attack.

In addition to, or as an alternative to, the determination as to whether the received signal should be considered to be a result of a replay attack, the received signal may also be passed to a biometric identification block 148.

The biometric identification block 148 operates on the recognition that the shapes 100, 102, 104 of the autocorrelation functions shown in FIG. 6, which illustrate the results of performing the autocorrelation function on speech signals received from three different speakers (User1, User2, and User3), differ significantly from each other.

Thus, the shape of the autocorrelation function can be used to determine which person is speaking.

This can in principle be used for any speech, but is particularly useful as a text dependent biometric where the user is expected to be speaking a specific known phrase, or one of a small number of known phrases.

The use of the autocorrelation function means that the system is robust against the influence of noise.

A second lag range, B, is defined, and the autocorrelation obtained over that lag range of the function is examined. The lag range B may extend over some or all of the total number of samples covered by the autocorrelation function.

The lag range B may be predetermined. For example, in the case of the autocorrelation functions shown in FIGS. 6 and 7, the lag range B might be the range from 50-150 samples.

As an alternative, the lag range B might be determined based on the shape of the autocorrelation function itself. For example, the lag range B might be the range above the location of the first positive peak +10%, or might be the range more than 20 samples above the first positive peak, or any other suitable range.

The lag range A and the lag range B are typically different, with the lag range A generally extending over shorter lags than the lag range B. The lag range A and the lag range B may overlap. In other embodiments, the upper end point of the lag range A is the lower end point of the lag range B. In still further embodiments, there is a gap between the lag range A and the lag range B.

A storage block 150 contains stored autocorrelation functions, or parts of autocorrelation functions, obtained from the speech of one or more enrolled user. In a text dependent system, the storage block 150 may contain the autocorrelation function derived from a user speaking a predetermined phrase. Where more than user is enrolled, the storage block 150 may contain the autocorrelation functions derived from those multiple users speaking the predetermined phrase, or speaking respective different predetermined phrases.

Thus, in step 134 of the process shown in FIG. 9, a comparison is made between at least a part of the autocorrelation and at least one previously stored autocorrelation. Specifically, in one example, a comparison can then be made between the autocorrelation function in the lag range B and one or more autocorrelation function retrieved from the storage block 150. When multiple autocorrelation functions are calculated as described above, for example once per frame of the received signal, this comparison can also be made once per frame, or the multiple autocorrelation functions can be averaged and the comparison can be made using the average.

Then, in step 136 of the process shown in FIG. 9, a speaker can be identified based on the comparison. Specifically, in one example, if the user has indicated their identity, the appropriate autocorrelation function can be retrieved from the storage block 150, and a speaker verification may be performed by comparing the two autocorrelation functions. If the degree of similarity is sufficient, it can be determined that there is a high probability that the identity indicated by the speaker is correct, and if the degree of similarity is below a threshold, it can be determined that there is a high probability that the identity indicated by the speaker is not correct. The degree of similarity can be assessed by the use of a trained neural network, or by directly comparing the functions, for example by determining the difference between the functions at each lag value, and summing these differences over the whole of lag range B.

If the user has not indicated their identity, all stored autocorrelation functions can be retrieved from the storage block 150, and a speaker identification may be performed by comparing the recently calculated autocorrelation function with the retrieved autocorrelation functions. The retrieved autocorrelation function that is closest to the recently calculated autocorrelation function can be determined to indicate the enrolled speaker who was speaking, provided that the degree of similarity meets some threshold test.

If the autocorrelation function derived from the received signal is analysed both in a spoof check block 146 and in a biometric identification block 148, the results of these analyses can be combined in a decision block 152.

Thus, the decision block 152 can generate an output that allows the received signal to be processed further only if the spoof check block 146 determines that the received signal does not result from a replay attack and if the biometric identification block 148 determines that the speech in the received signal was spoken by the purported speaker.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of detecting a replay attack on a voice biometrics system, the replay attack comprising playback of a recording of speech through a loudspeaker, the method comprising:
   receiving a speech signal;
   forming an autocorrelation of at least a part of the speech signal; and
   identifying, based on said autocorrelation, that the received speech signal may comprise a recording of the speech played back through the loudspeaker as a result of the replay attack;
   wherein forming an autocorrelation of at least a part of the speech signal comprises:
      dividing the at least a part of the speech signal into frames of data;
      forming a respective partial autocorrelation of each of the frames of data; and
      averaging said partial autocorrelations to form said autocorrelation;
   wherein identifying that the received speech signal may result from a replay attack comprises:
      comparing the autocorrelation with a reference value; and
      identifying that the received speech signal may result from a replay attack based on a result of the comparison of the autocorrelation with the reference value; and
   wherein comparing the autocorrelation with the reference value comprises comparing at least one feature associated with a negative maximum and/or a positive maximum of the autocorrelation with a reference value obtained from at least one other autocorrelation.

2. A method as claimed in claim 1, wherein comparing the autocorrelation with a reference value comprises comparing at least one feature from a first range of lag values of the autocorrelation with a reference value obtained from at least one other autocorrelation.

3. A method as claimed in claim 1, wherein the at least one other autocorrelation is obtained from a user during enrolment.

4. A method as claimed in claim 1, wherein the reference value is a property of autocorrelations obtained from multiple users.

5. A method as claimed in claim 1, wherein identifying that the received speech signal may comprise a recording of the speech played back through the loudspeaker as a result of the replay attack comprises:

supplying the autocorrelation to a neural network trained to distinguish autocorrelations formed from speech signals resulting from replay attacks from autocorrelations formed from speech signals not resulting from replay attacks.

6. A method as claimed in claim 1, wherein the received speech signal includes speech segments and non-speech segments, the method comprising:
selecting the speech segments of the speech signal as said part of the speech signal; and
forming an autocorrelation of the selected speech segments of the speech signal.

7. A method as claimed in claim 1, wherein the received speech signal includes voiced speech segments and unvoiced speech segments, the method comprising:
selecting the voiced speech segments of the speech signal as said part of the speech signal; and
forming an autocorrelation of the selected voiced speech segments of the speech signal.

8. A system for detecting a replay attack on a voice biometrics system, the replay attack comprising playback of a recording of speech through a loudspeaker, the system comprising:
an input for receiving a speech signal; and
a processor configured for forming an autocorrelation of at least a part of the speech signal and for identifying, based on said autocorrelation, that the received speech signal may comprise a recording of the speech played back through the loudspeaker as a result of a replay attack;
wherein forming an autocorrelation of at least a part of the speech signal comprises:
dividing the at least a part of the speech signal into frames of data;
forming a respective partial autocorrelation of each of the frames of data; and
averaging said partial autocorrelations to form said autocorrelation;
wherein identifying that the received speech signal may result from a replay attack comprises:
comparing the autocorrelation with a reference value; and
identifying that the received speech signal may result from a replay attack based on a result of the comparison of the autocorrelation with the reference value; and
wherein comparing the autocorrelation with the reference value comprises comparing at least one feature associated with a negative maximum and/or a positive maximum of the autocorrelation with a reference value obtained from at least one other=autocorrelation.

9. A non-transitory computer readable storage medium having computer-executable instructions stored thereon that, when executed by processor circuitry, cause the processor circuitry to perform a method according to claim 1.

* * * * *